(12) United States Patent
Yamaguchi et al.

(10) Patent No.: US 12,128,836 B2
(45) Date of Patent: Oct. 29, 2024

(54) WIRING MODULE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Koji Yamaguchi, Mie (JP); Hiroki Hirai, Mie (JP); Makoto Higashikozono, Mie (JP); Housei Mizuno, Mie (JP); Koichiro Goto, Mie (JP); Junichi Shirakawa, Mie (JP)

(73) Assignees: AutoNetworks Technologies, Ltd., Mie (JP); Sumitomo Wiring Systems, Ltd., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 125 days.

(21) Appl. No.: 17/909,592

(22) PCT Filed: Mar. 4, 2021

(86) PCT No.: PCT/JP2021/008378
§ 371 (c)(1),
(2) Date: Sep. 6, 2022

(87) PCT Pub. No.: WO2021/192886
PCT Pub. Date: Sep. 30, 2021

(65) Prior Publication Data
US 2023/0115337 A1    Apr. 13, 2023

(30) Foreign Application Priority Data
Mar. 23, 2020 (JP) .................................. 2020-050927

(51) Int. Cl.
*B60R 16/02* (2006.01)
*H01B 7/40* (2006.01)
(Continued)

(52) U.S. Cl.
CPC ........... *B60R 16/0215* (2013.01); *H01B 7/40* (2013.01); *H02G 3/0437* (2013.01); *H02G 3/36* (2013.01)

(58) Field of Classification Search
None
See application file for complete search history.

(56) References Cited

U.S. PATENT DOCUMENTS 3,346,688 A * 10/1967 Fields ....................... F16L 3/23
24/339
4,009,852 A * 3/1977 Bulanda ................ F16L 3/1075
24/324
(Continued)

FOREIGN PATENT DOCUMENTS

CN    110770854    2/2020
JP    52-145500 U    11/1977
(Continued)

OTHER PUBLICATIONS

International Search Report issued in International Patent Application No. PCT/JP2021/008378, dated May 25, 2021, along with an English translation thereof.
(Continued)

*Primary Examiner* — Krystal Robinson
(74) *Attorney, Agent, or Firm* — Greenblum & Bernstein, P.L.C.

(57) ABSTRACT

An object is to provide a technique capable of fixing a plurality of wiring members to the attachment surface as close as possible. A wiring module includes: a base member having an attachment surface; a plurality of wiring members disposed on the attachment surface; and a holding member holding the plurality of wiring members in an arranged state on the attachment surface. The holding member includes at least one sheet portion in which at least one hole is formed. The plurality of wiring members are passed through the at
(Continued)

least one hole and held in the arranged state. The sheet portion is joined to the attachment surface.

12 Claims, 7 Drawing Sheets

(51) Int. Cl.
*H02G 3/04* (2006.01)
*H02G 3/36* (2006.01)

(56) References Cited

U.S. PATENT DOCUMENTS

| | | | |
|---|---|---|---|
| 6,528,728 B1* | 3/2003 | Shima | H02G 3/0437 174/101 |
| 2002/0050396 A1 | 5/2002 | Takahashi | |
| 2007/0241241 A1* | 10/2007 | Peterson | F16L 3/127 248/65 |
| 2015/0096802 A1* | 4/2015 | Itani | B60R 16/0215 174/72 A |
| 2020/0172027 A1 | 6/2020 | Mizuno et al. | |
| 2021/0098976 A1 | 4/2021 | Yamaguchi et al. | |
| 2023/0106640 A1* | 4/2023 | Nakano | H02G 3/0418 174/72 A |

FOREIGN PATENT DOCUMENTS

| | | |
|---|---|---|
| JP | 57-25535 Y2 | 6/1982 |
| JP | 59-14308 | 1/1984 |
| JP | 62-172186 U | 10/1987 |
| JP | 4-108815 U | 9/1992 |
| JP | 10-275989 | 10/1998 |
| JP | 2001-337399 | 12/2001 |
| JP | 2007-93309 | 4/2007 |
| JP | 2013-135504 | 7/2013 |
| JP | 2015-71333 | 4/2015 |
| JP | 2015-139306 | 7/2015 |
| JP | 2017-93124 | 5/2017 |
| JP | 2017-184521 | 10/2017 |
| JP | 2018-26198 | 2/2018 |
| WO | 2019/187334 | 10/2019 |

OTHER PUBLICATIONS

International Preliminary Report on Patentability issued in International Patent Application No. PCT/JP2021/008378, dated Oct. 6, 2022, along with an English translation thereof.
China Office Action issued in China Patent Application No. 202180019556.3, dated Oct. 28, 2023, together with English translation thereof.
Japan Office Action issued in Japan Patent Application No. 2020-50927, dated Aug. 1, 2023, together with English translation thereof.
Japan Office Action issued in Japan Patent Application No. 2023-161848, dated May 14, 2024, together with English translation thereof.
China Office Action issued in China Patent Application No. 202180019556.3, dated Jun. 1, 2024, together with English translation thereof.

* cited by examiner

WIRING MODULE

TECHNICAL FIELD

The present disclosure relates to a wiring module.

BACKGROUND ART

Patent Document 1 discloses a wire harness including a plurality of wiring members and a sheet in which a plurality of holes are formed. In the wire harness described in Patent Document 1, the plurality of wiring members are passed through the plurality of holes, respectively, and held in an arranged state.

PRIOR ART DOCUMENTS

Patent Documents

Patent Document 1: Japanese Patent Application Laid-Open No. 2018-26198

SUMMARY

Problem to be Solved by the Invention

It is desired that the plurality of wiring members are fixed to an attachment surface as close as possible.

Accordingly, an object is to provide a technique capable of fixing the plurality of wiring members to the attachment surface as close as possible.

Means to Solve the Problem

A wiring module according to the present disclosure is a wiring module including: a base member having an attachment surface; a plurality of wiring members disposed on the attachment surface; and a holding member holding the plurality of wiring members in an arranged state on the attachment surface, wherein the holding member includes at least one sheet portion in which at least one hole is formed, the plurality of wiring members are passed through the at least one hole and held in the arranged state, and the sheet portion is joined to the attachment surface.

Effects of the Invention

According to the present disclosure, the plurality of wiring members can be fixed to the attachment surface as close as possible.

DESCRIPTION OF EMBODIMENT(S)

Description of Embodiment of Present Disclosure

Embodiments of the present disclosure are listed and described firstly.

A wiring module according to the present disclosure is as follows.

(1) A wiring module includes: a base member having an attachment surface; a plurality of wiring members disposed on the attachment surface; and a holding member holding the plurality of wiring members in an arranged state on the attachment surface, wherein the holding member includes at least one sheet portion in which at least one hole is formed, the plurality of wiring members are passed through the at least one hole and held in the arranged state, and the sheet portion is joined to the attachment surface. A part of the sheet portion around the hole is joined to the attachment surface while the wiring member is passed through the hole in the sheet portion, thus the sheet portion suppresses the plurality of wiring members away from the attachment surface. Accordingly, the wiring member can be fixed to the attachment surface as close as possible.

(2) In the wiring module according to (1), the sheet portion may be fused to the attachment surface. Accordingly, the sheet portion is simply joined to the attachment surface.

(3) In the wiring module according to (1) or (2), it is also applicable that the holding member includes a plurality of sheet portions made up of the plurality of sheet portions connected in a longitudinal direction of the wiring members, and the holes in the plurality of sheet portions are formed in positions so that the holes which correspond to each other are overlapped with each other when the plurality of sheet portions are bended at a predetermined position and overlapped with each other. The wiring member can be held by the plurality of sheet portions. The holes in the plurality of sheet portions are formed in positions where the corresponding holes can be overlapped with each other when the plurality of sheet portions are overlapped with each other, thus the wiring member can be simply passed through the holes of the plurality of sheet portions in a state where the plurality of sheet portions are overlapped with each other.

(4) In the wiring module according to (3), a fold line may be formed in the predetermined position. Accordingly, the plurality of sheet portions are bended along the fold line, thus the plurality of sheet portions can be easily overlapped with each other so that the corresponding holes are overlapped with each other.

(5) In the wiring module according to any one of (1) to (4), an edge portion of the holding member which is provided in an end portion of the wiring member is located closer to a side of the attachment surface in relation to the wiring member, the edge portion provided on a side of the end portion of the wiring member in the holding member. Accordingly, when the end portion of the wiring member is grasped and operated, the holding member hardly interferes with the operation, and the operation is easily performed.

(6) In the wiring module according to any one of (1) to (5), it is also applicable that a portion where the sheet portion covers the wiring member is a crest portion, and a portion of the sheet portion located on a lateral side of the crest portion is joined to the attachment surface. Accordingly, the wiring member is pressed against the attachment surface by the holding member.

(7) In the wiring module according to any one of (1) to (6), a plurality of holes disposed separately in a plurality of stages may be formed as the holes. Accordingly, the plurality of wiring members may be held separately in the plurality of stages.

(8) In the wiring module according to (7), a hole in a second stage in the plurality of holes may be formed in a position between the holes in a first stage. Accordingly, a density of the holes is increased.

(9) In the wiring module according to any one of (1) to (8), the plurality of wiring members may be passed through one hole of the at least one hole. Accordingly, the plurality of wiring members are passed through one hole, thereby being held in an arranged state.

(10) In the wiring module according to any one of (1) to (9), a groove in which at least one of the plurality of wiring members and the holding member is housed may be formed in the base member. Accordingly, the plurality of wiring members are disposed along the groove.

Details of Embodiment of Present Disclosure

Specific examples of a wiring module of the present disclosure are described hereinafter with reference to the drawings. The present disclosure is not limited to these examples, hut is indicated by claims, and it is intended that meanings equivalent to claims and all modifications within a scope of claims are included.

Embodiment 1

Figure 1:
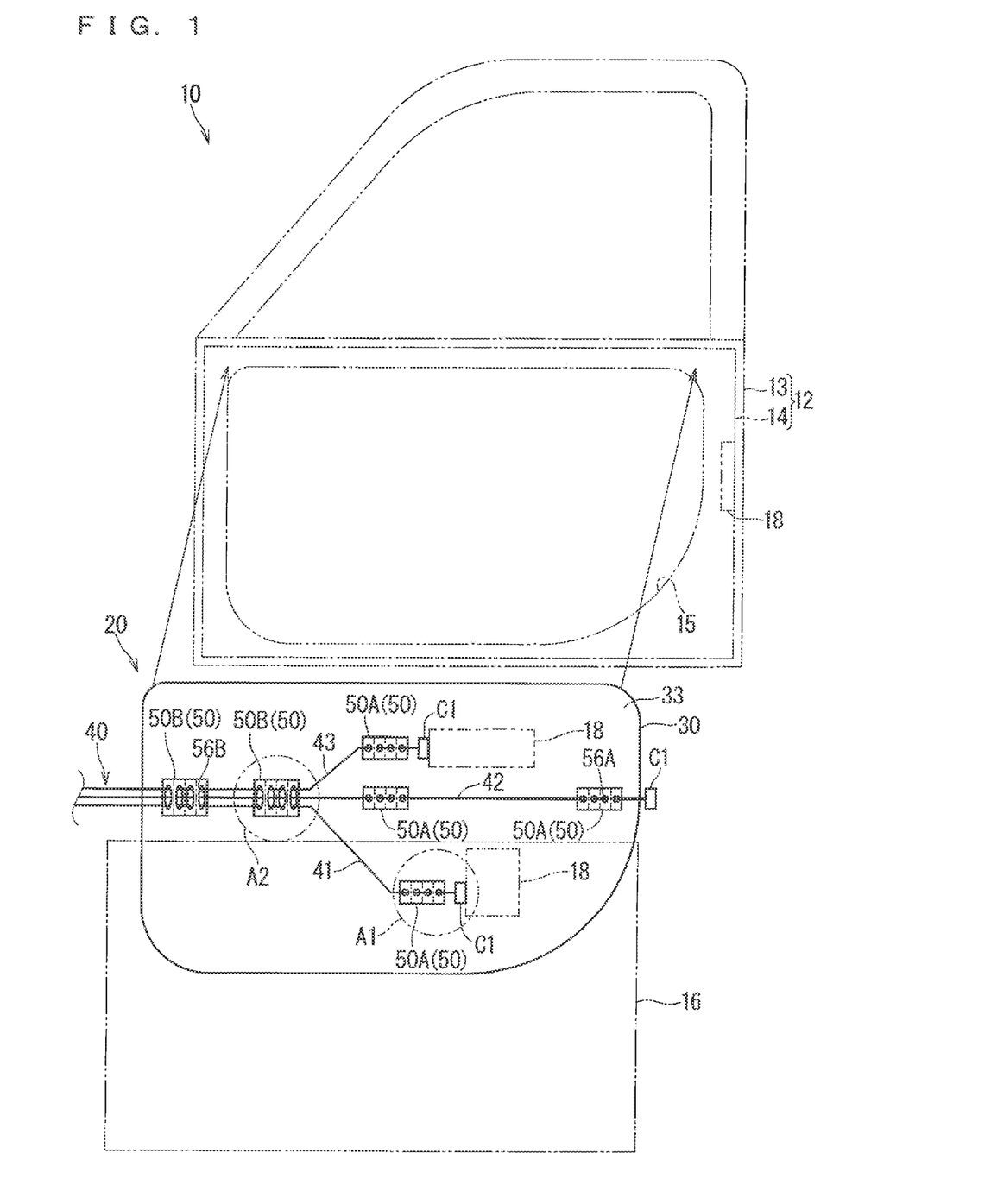
FIG. 1 is a plan view illustrating a wiring module according to an embodiment 1.

A wiring module according to an embodiment 1 is described hereinafter. FIG. 1 is a plan view illustrating a wiring module 20 according to the embodiment 1. In the description herein, the wiring module 20 is incorporated into a door 10 in a vehicle. The door 10 into which the wiring module 20 is incorporated is described firstly.

The door 10 is formed into a flat shape as a whole, and is a portion openable and closable to partition an inner side and outer side of a vehicle. The door 10 is assumed to be a driver side door, a passenger's side door, and a rear seat door, for example. The door 10 includes a door panel 12 and a door trim 16.

The door panel 12 includes an outer panel 13 and an inner panel 14. The outer panel 13 is provided in a part of the door 10 facing an outer side of the vehicle. The outer panel 13 is a part constituting an outer appearance of the vehicle together with a body. The inner panel 14 is provided on a vehicle interior side of the outer panel 13. The inner panel 14 is provided with an opening 15. The opening 15 is also referred to as a service hole.

The door trim 16 is provided in a part of the door 10 facing an inner side of the vehicle. The door trim 16 is attached to an inner side of the door panel 12. The door trim 16 is a part constituting an inner appearance of the vehicle.

An apparatus 18 is incorporated into the door 10. The apparatus 18 incorporated into the door 10 is determined in accordance with a type of vehicle, a grade, and an option, for example. The apparatus 18 is assumed to be a motor opening and closing a window, an actuator for locking and unlocking the door 10, a speaker, a courtesy lamp, various switches, and an electrical control unit controlling them, for example. Some or all of the apparatuses 18 incorporated into the door 10 may be incorporated into the base member 30.

The wiring module 20 is incorporated between the door panel 12 and the door trim 16. The wiring module 20 is provided to supply electrical power to the apparatus 18 or transmit a signal between the apparatus 18 and a vehicle side apparatus. The wiring module 20 is attached to the inner panel 14 to close the opening 15, for example. The wiring module 20 includes the base member 30, a plurality of wiring members 40, and a holding member 50.

<Base Member>

The base member 30 is disposed between the door panel 12 and the door trim 16 in the door 10. The base member 30 is a member planarly extending on the door panel 12 and the door trim 16. The base member 30 is a flat component extending over an area substantially equal to or larger than the opening 15. The base member 30 is attached to the opening 15 of the inner panel 14 to cover the opening 15. Accordingly, the base member 30 can partition the inner side and outer side of the vehicle. The base member 30 is attached to the opening 15 of the inner panel 14, and the attaching state is retained by a screwing structure or a locking structure, for example. For example, when a part of a peripheral portion of the base member 30 overlapped with the inner panel 14 is screwed to the inner panel 14 using a screw, for example, a gap therebetween can be practicably covered.

A space is formed between the outer panel 13 and the inner panel 14 and between the outer panel 13 and the base member 30 while the base member 30 is attached to the inner panel 14. A window of the door 10 can be housed in this space. A window exposed to a rainwater environment is housed in the space, and a slit-like opening through which the window goes in and out is formed on an upper side of the space. Thus, the space is a space which water may enter. The space is a space which may be connected to an outer space, thus is also a space which a wind noise, for example, may enter from outside. The base member 30 is provided as a member for completely partitioning a vehicle interior space and an outer space with the inner panel 14.

More specifically, the base member 30 is a molded component made of resin or metal, for example. The base member 30 includes a main plate 32. The main plate 32 is a plate-like part with a sufficient size for covering the opening 15. Herein, a surface of the main plate 32 facing the inner side of the vehicle is an attachment surface 33. A surface of the main plate 32 facing the outer side of the vehicle may be an attachment surface. Both surfaces of the main plate 32 facing the inner side and the outer side of the vehicle may be attachment surfaces.

The attachment surface 33 may be flat. The attachment surface 33 may be formed into a concave-convex shape. A part of the attachment surface 33 covering the opening 15 may be concaved to the outer side of the vehicle more than a part thereof covering a periphery of the opening 15 to enter the opening 15. The plurality of wiring members 40 are disposed on the attachment surface 33. A part of the attachment surface 33 following a route along which the wiring member 40 is disposed may be flat. The part following the route along which the wiring member 40 is disposed may have a concave-convex shape.

<Wiring Member>

The wiring member 40 is connected to the apparatus 18. The wiring member 40 is a wiring for supplying electrical power to the apparatus 18 or transmitting a signal between the apparatus 18 and a vehicle side apparatus. Herein, the wiring member 40 includes a plurality of electrical wires 41, 42, and 43. The electrical wires 41, 42, and 43 may be a covering wire. The covering wire includes a core wire and a covering layer around the core wire. The electrical wires 41, 42, and 43 may be a single-core wire, or may also be a multicore wire. The wiring member 40 may include an optical fiber cable.

The plurality of electrical wires 41, 42, and 43 include a first electrical wire 41, a second electrical wire 42, and a third electrical wire 43. The first electrical wire 41, the second electrical wire 42, and the third electrical wire 43 are connected to different apparatuses 18, respectively. The first electrical wire 41, the second electrical wire 42, and the third electrical wire 43 includes one or a plurality of electrical wires, respectively, and are set in accordance with the apparatus 18.

The first electrical wire 41, the second electrical wire 42, and the third electrical wire 43 are collected in a parallel state on each one end side. One end portions of the plurality of electrical wires 41, 42, and 43 extend from a side of a hinge of the door 10 in a collected state and are led to an inner side of a vehicle body. One end portions of the plurality of electrical wires 41, 42, and 43 are assumed to be connected to the other connector provided in one end portion of a wiring in the vehicle body via a common connector, for example. Accordingly, an electrical power supply to the apparatus 18 and communication between the apparatus 18 and a vehicle side apparatus can be performed via the wiring member 40. When an electrical control unit is provided in the door 10, a wiring member connecting the electrical control unit and a wiring in the vehicle body and a wiring member connecting the electrical control unit and the apparatus 18 are preferably provided as the wiring member 40.

The other end portions of the first electrical wire 41, the second electrical wire 42, and the third electrical wire 43 are connected to the apparatus 18. Herein, wiring side connectors C1 are attached to the other end portions of the first electrical wire 41, the second electrical wire 42, and the third electrical wire 43, respectively. An apparatus side connector C2 is provided in the apparatus 18. The wiring side connector C1 and the apparatus side connector C2 are connected to each other. The electrical wires 41, 42, and 43 and the apparatus 18 may be connected to each other without an intervention of the connectors C1 and C2.

The plurality of electrical wires 41, 42, and 43 extends on the base member 30 while being collected from one end side. The plurality of electrical wires 41, 42, and 43 are branched into the first electrical wire 41, the second electrical wire 42, and the third electrical wire 43 on the base member 30. In the example illustrated in FIG. 1, the first electrical wire 41, the second electrical wire 42, and the third electrical wire 43 are branched at one branch position on the base member 30. The first electrical wire 41, the second electrical wire 42, and the third electrical wire 43 may be branched at different positions on the base member 30. For example, the first electrical wire 41 and the second electrical wire 42 may be branched at a first branch position, and the first electrical wire 41, the second electrical wire 42, and the third electrical wire 43 may be branched at a second branch position closer to a door hinge than the first branch position. The first electrical wire 41, the second electrical wire 42, and the third electrical wire 43 extend from the branch position to the apparatus 18 along a route in accordance with a position of the apparatus 18. Any route is applicable as a route from the branch position to the apparatus 18, however, a route as short as possible is preferable. A portion where the plurality of electrical wires 41, 42, and 43 are collected is a main wire part. Portions where the first electrical wire 41, the second electrical wire 42, and the third electrical wire 43 separately extend after the plurality of electrical wires 41, 42, and 43 are branched are branch wire parts.

<Holding Member>

Figure 2:
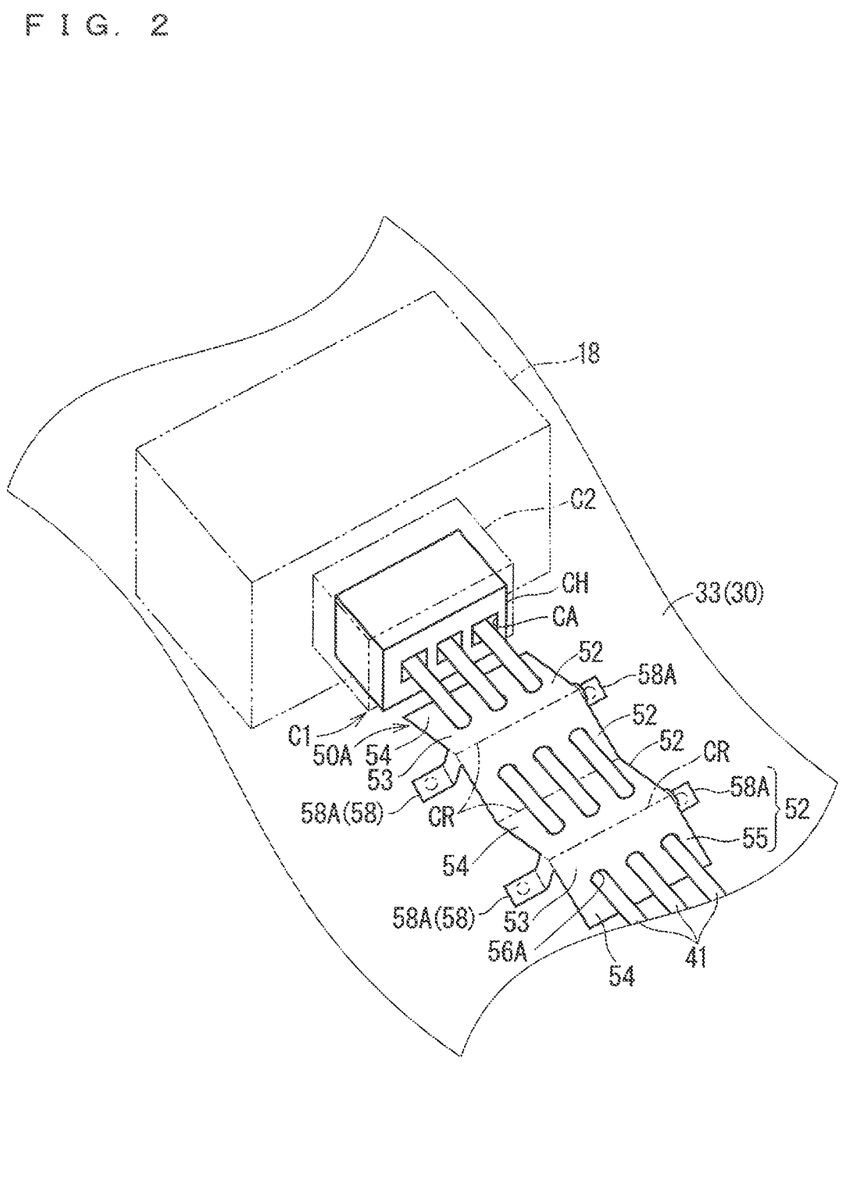
FIG. 2 is an enlarged perspective view of a region A1 in FIG. 1.
Figure 3:
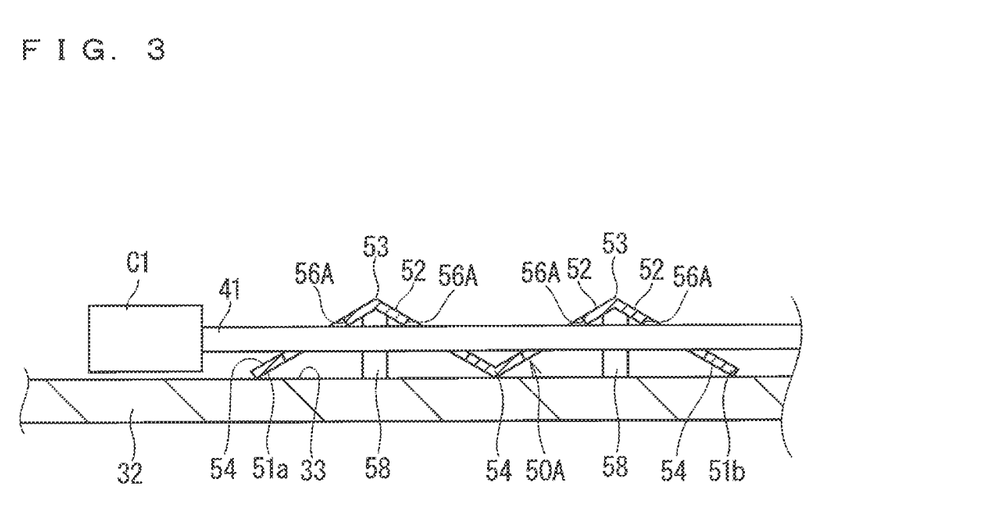
FIG. 3 is a schematic cross-sectional view of a region A1 in FIG. 1.
Figure 4:
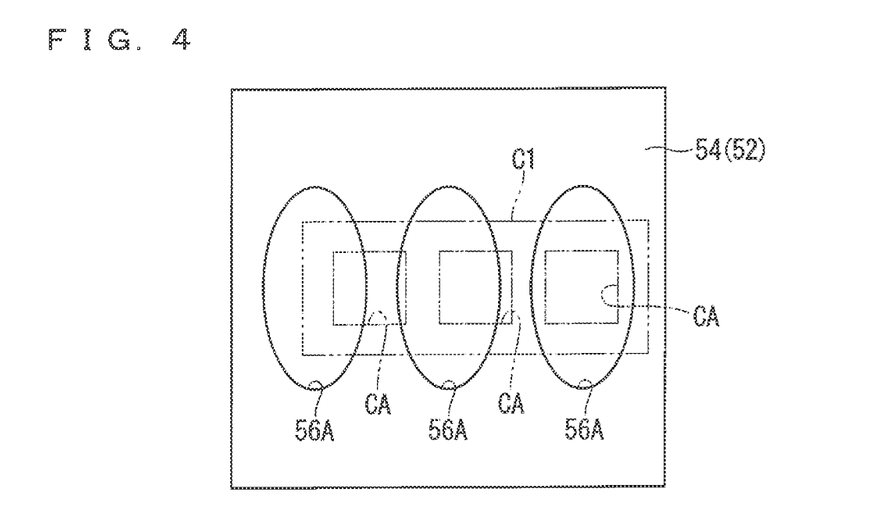
FIG. 4 is an explanation diagram illustrating a holding member attached to a wiring member.
Figure 5:
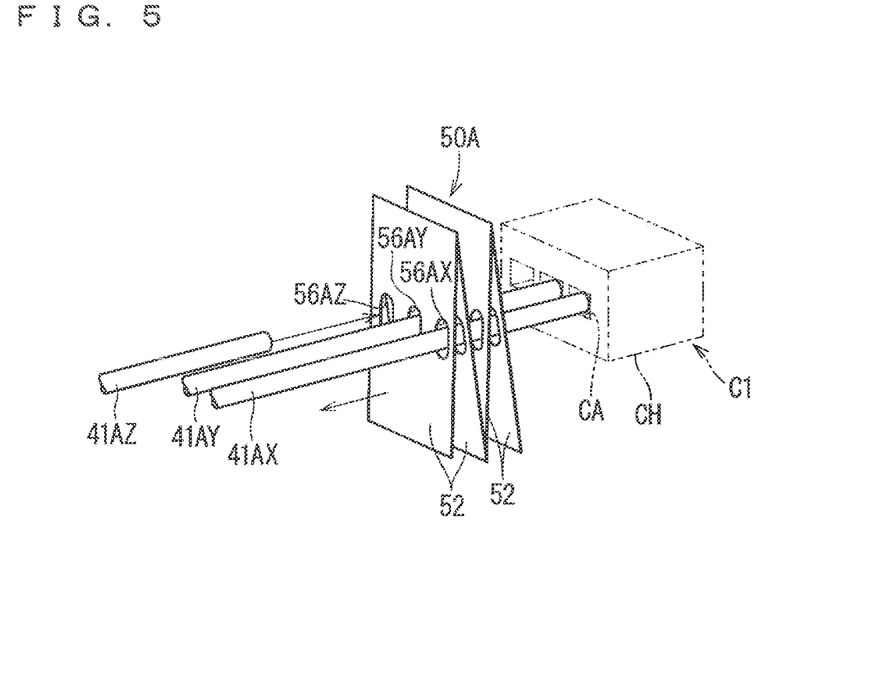
FIG. 5 is an explanation diagram illustrating the holding member attached to the wiring member.
Figure 6:
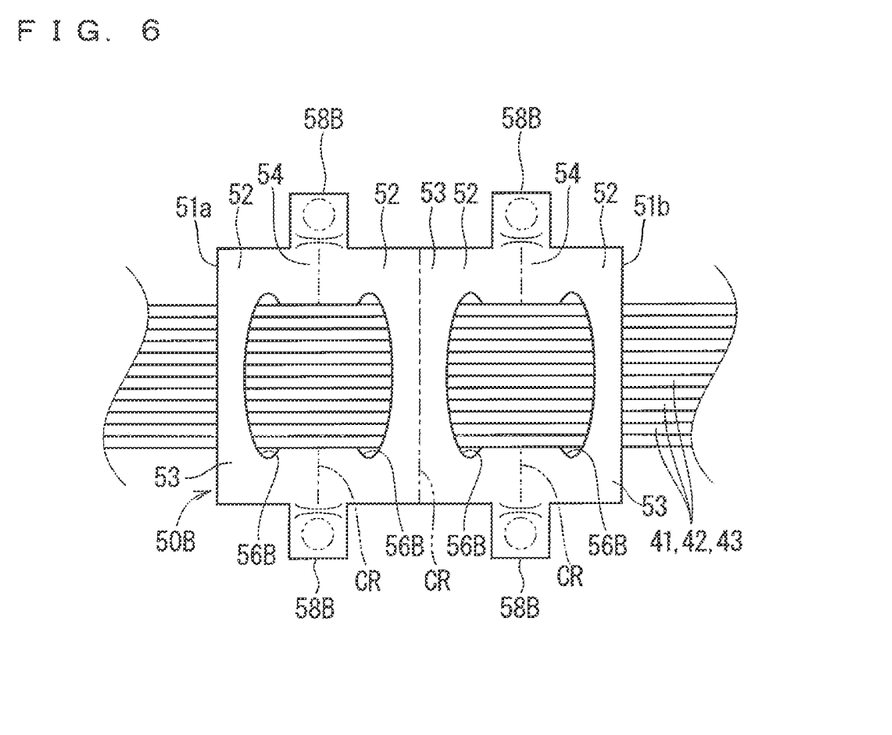
FIG. 6 is an enlarged plan view of a region A2 in FIG. 1.
Figure 7:
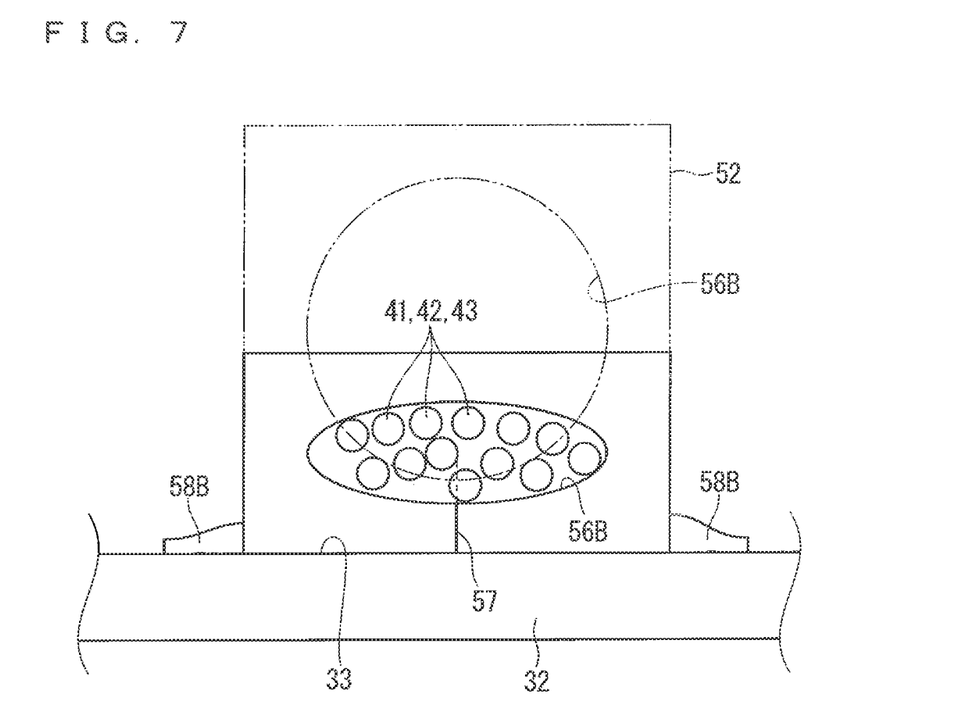
FIG. 7 is a schematic enlarged front view of the region A2 in FIG. 1.
Figure 8:
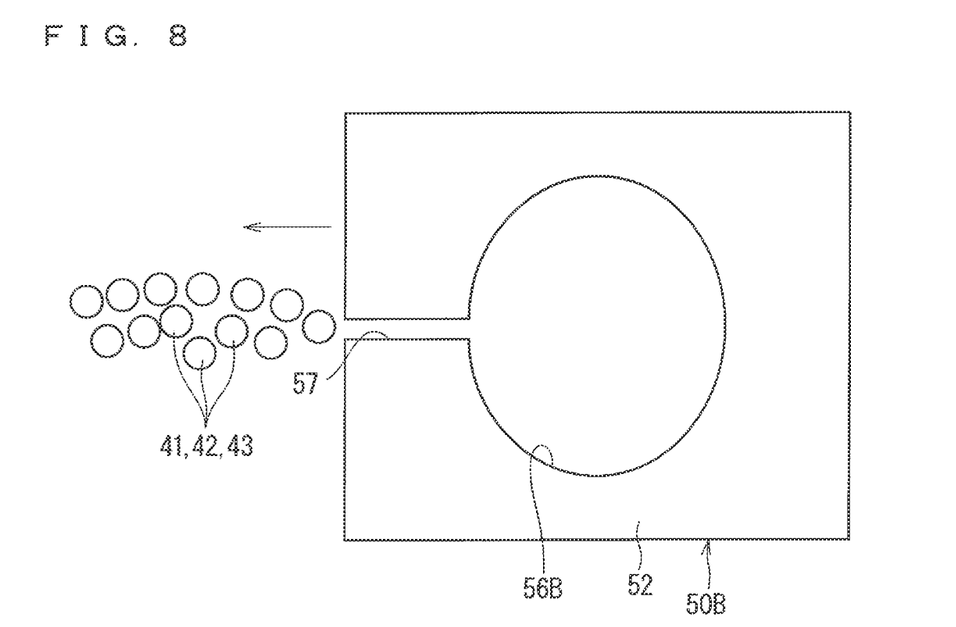
FIG. 8 is an explanation diagram illustrating the holding member attached to the wiring member.

Herein, the branch wire part is provided with a holding member 50A, and the main wire part is provided with a holding member 50B. When the holding members 50A and 50B need not be particularly distinguished, they are simply referred to as the holding member 50. The holding member 50 is described in detail with reference to FIG. 2 to FIG. 8. FIG. 2 is an enlarged perspective view of a region A1 in FIG. 1. FIG. 3 is a schematic cross-sectional view of the region A1 in FIG. 1. FIG. 3 is a vertical cross-sectional view cut along a plane perpendicular to the attachment surface 33 and parallel to an extension direction of the wiring member 40. FIG. 4 and FIG. 5 are explanation diagrams each illustrating a protection member attached to the wiring member 40. FIG. 6 is an enlarged plan view of a region A2 in FIG. 1. FIG. 7 is a schematic enlarged front view of the region A2 in FIG. 1. FIG. 8 is an explanation diagram illustrating a protection member attached to the wiring member 40.

The holding member 50 keeps the plurality of wiring members 40 in a state of being arranged side by side. The holding member 50 includes at least one sheet portion 52. At least one hole 56 is formed in the sheet portion 52. The plurality of wiring members 40 pass through the hole 56 and are held in a state of being arranged side by side.

Any material and structure may be applied to those of the sheet portion 52. Applicable as the material thereof is a flexible resin such as soft polyvinyl chloride (PVC) or rigid resin such as rigid PVC or polypropylene (PP). With regard to the structure, the sheet portion 52 may be a sheet having a porous structure such as a non-woven cloth or a foam sheet or a sheet with an evenly filled cross-sectional surface (also referred to as a non-foam sheet or a solid sheet, for example).

The sheet portion 52 may be a soft member (flexible member). The sheet portion 52 may be a hard member (member having high rigidity). The sheet portion 52 may be a member having higher rigidity than covering layers of the electrical wires 41, 42, and 43. Hardness may be different between a part of the sheet portion 52 and the other part thereof. The hardness of the sheet portion 52 is determined by a material and a structure, for example. For example, with regard to the material, a sheet made up of flexible resin as a material tends to be softer than a sheet made up of rigid resin as a material. For example, with regard to the structure, a porous sheet tends to be softer than a solid sheet.

Herein, the plurality of holding members 50 are formed to be connected in a longitudinal direction of the wiring member 40. The holding member 50 includes the plurality of sheet portions 52. When the plurality of sheet portions 52 are connected to constitute the holding member 50, it is preferable that the sheet portions 52 are not broken but can be bended. Described herein is an example that the holding member 50 includes four sheet portions 52. The number of the sheet portions 52 is not limited thereto, however, the number thereof may be two, three, or five or more. The number of the sheet portions 52 may be an odd number or an even number. When the number of the sheet portions 52 is an odd number, an edge portion 51a on one end side of the protection member along the extension direction of the wiring member 40 and an edge portion 51b on the other end side thereof are directed to directions opposite to each other. When the number of the sheet portions 52 is an even number, the edge portion 51a on one end side of the holding member 50 and an edge portion 51b on the other end side thereof are directed to the same direction.

The holes 56 in the plurality of sheet portions 52 are formed in positions so that the corresponding holes 56 can be overlapped with each other when the plurality of sheet portions 52 are bended at a predetermined position and overlapped with each other. The predetermined position corresponds to a connection portion of the plurality of sheet portions 52. A fold line CR is formed in the predetermined position in the holding member 50.

When the holding member 50 is a hard member such as a PP sheet, the fold line CR is normally made when the holding member 50 is bended. When the holding member 50 is a soft member such as a non-woven cloth, there is a case where the fold line CR is not made when the holding member 50 is beaded. In this case, the fold line CR may be made by pressing a bended portion while the holding member 50 is bended. The fold line CR is formed in the holding member 50, thus the plurality of sheet portions 52 are kept in a bended state even when they are developed.

The sheet portion 52 is joined to the attachment surface 33. The hole 56 is formed in an intermediate region along a width direction of the sheet portion 52. Both side regions of the sheet portion 52 are joined to the attachment surface 33. Herein, the sheet portion 52 includes a body 55 and a fixing piece 58. The body 55 is a part where the hole 56 is formed. Any shape is applicable as a shape of the body 55, however, preferable is a shape easily connecting the plurality of sheet portions 52 such as a rectangular shape. A fixing piece 58 is a part in which a part of the body 55 protrudes outside. Herein, a part of a side edge portion of the body 55 protrudes to a lateral side to be the fixing piece 58. The fixing piece 58 extends to a lateral side of the connection portion. The fixing piece 58 may extend to a lateral side of the edge portions 51a and 51b. The fixing piece 58 may extend from an intermediate portion of the side edge portion of the body 55 to a lateral side.

Any joint state is applicable as a joint state of the sheet portion 52 and the attachment surface 33. For example, the sheet portion 52 and the attachment surface 33 may be joined via a joint member such as an adhesive agent or a double-sided adhesive tape, for example. For example, the sheet portion 52 and the attachment surface 33 may be directly joined without an intervention of the other joint member. For example, the sheet portion 52 and the attachment surface 33 may be directly joined by fusion. When the sheet portion 52 and the attachment surface 33 are fused to each other, at least one of a resin material of the sheet portion 52 and a resin material of the attachment surface 33 is melted and adheres to the other side member. Both the resin material of the sheet portion 52 and the resin material of the attachment surface 33 may be melted and adhere to the other side member. When the resin material of the sheet portion 52 and the resin material of the attachment surface 33 is the same material, both materials are melted and easily adhere to the other side member.

The wiring member 40 passes through the hole 56 of the sheet portion 52 and is disposed on the attachment surface 33, thus there is an overlapping portion in the wiring module 20 in which the sheet portion 52 and the wiring member 40 are overlapped with each other along a normal line direction of the attachment surface 33. Then, there are a portion where the wiring member 40 is covered and a portion where the sheet portion 52 is covered the overlapping portion.

The portion where the wiring member 40 is covered is a portion where the sheet portion 52 covers the wiring member 40. The portion where the wiring member 40 is covered is a portion where the sheet portion 52 is located on an upper side of the wiring member 40 in relation to the attachment surface 33 in the overlapping portion. In the portion where the wiring member 40 is covered, the wiring member 40 is located closer to a side of the attachment surface 33 in relation to the sheet portion 52. The portion of the sheet portion 52 covering the wiring member 40 is referred to as a crest portion 53.

The portion where the sheet portion 52 is covered is a portion where the wiring member 40 covers the sheet portion 52. The portion where the sheet portion 52 is covered is a portion where the wiring member 40 is located on an upper side of the sheet portion 52 in relation to the attachment surface 33 in the overlapping portion. In the portion where the sheet portion 52 is covered, the sheet portion 52 is located closer to the side of the attachment surface 33 in relation to the wiring member 40. The portion of the sheet portion 52 covered by the wiring member 40 is referred to as a trough portion 54.

When one sheet portion 52 is located, one of two edge portions of the holding member serves as the crest portion 53 and the other one thereof serves as a trough portion 54. When two or more sheet portions 52 are connected to each other, one or more connection portions between the sheet portions 52 are provided. One of the two edge portions of the holding member is one of the crest portion 53 and the trough portion 54, and the crest portion 53 and the trough portion 54 are alternately formed continuously to the other edge portion via the connection portion. For example, when two sheet portions 52 are connected to each other, one connection portion is provided. One connection portion is one of the crest portion 53 and the trough portion 54, and each of two edge portions of the holding member 50 serves as the other one of the crest portion 53 and the trough portion 54. When three sheet portions 52 are connected to each other, two connection portions between the sheet portions 52 are provided. One of the two connection portions serves as the crest portion 53 and the other one thereof serves as the trough portion 54. The edge portion in the two edge portions of the holding member 50 connected to the connection portion serving as the trough portion 54 serves as the crest portion 53, and the edge portion connected to the connection portion serving as the crest portion 53 serves as the trough portion 54.

The holding member 50 is attached in an attachment posture in which the sheet portion 52 obliquely extends with respect to the attachment surface 33. In the attachment posture, the electrical wires 41, 42, and 43 may extend as straight as possible as illustrated in FIG. 3. When the attachment posture of the holding member 50 is close to parallel to the attachment surface 33, there may be a case where the electrical wires 41, 42, and 43 meander to get close to and away from the attachment surface 33. For example, when the sheet portion 52 is a hard member, the electrical wires 41, 42, and 43 have contact with a periphery of the hole 56 and meander. At this time, the electrical wire 41, 42, and 43 get closest to the attachment surface 33 in a lower side of the crest portion 53. The electrical wires 41, 42, and 43 get away from the attachment surface 33 from a portion on the lower side of the crest portion 53 toward an upper side of the trough portion 54. In a case where the sheet portion 52 is a soft member, when the attachment posture of the holding member 50 is close to parallel to the attachment surface 33, there may be a case where the sheet portion 52 is bended.

The holding member 50A provided on the branch wire part is described in more detail hereinafter with reference to FIG. 2 to FIG. 5. The holding member 50A in the region A1 is the holding member 50A attached to the first electrical wire 41, and the holding member 50A attached to the second electrical wire 42 and the third electrical wire 43 in the branch wire part also has a similar configuration.

A plurality of holes 56A are formed in the holding member 50A. A plurality of electrical wires 41X, 41Y, and 41Z of the first electrical wire 41 pass through the plurality of holes 56A, respectively. The plurality of holes 56A are disposed to be arranged side by side along one line. The hole 56A is provided only in one stage. The plurality of holes 56A are formed to have the same size. The plurality of holes 56A may be formed to have different sizes. The plurality of holes 56A may have a first hole and a second hole larger than the first hole.

The hole 56A preferably has a shape close to a circular shape when viewed from the extension direction of the electrical wire 41 while the holding member 50A is in the attachment posture. As illustrated in FIG. 4, the hole 56A is formed to have a long size in one side in the sheet portion 52 when viewed from the normal line direction of the sheet portion 52. The hole 56A is formed to have a long size in a direction perpendicular to a direction in which the plurality of holes 56A are arranged side by side. Accordingly, the hole 56A has a shape close to a circular shape when viewed from the extension direction of the electrical wire 41 in the attachment posture.

In the example illustrated in FIG. 2, three electrical wires 41X, 41Y, and 41Z are connected to the wiring side connector C1. Three holes 56AX, 56AY, and 56AZ are formed in the holding member 50A. The three electrical wires 41X, 41Y, and 41Z pass through different holes 56A, respectively. Particularly, the electrical wire 41X passes through the hole 56AX. The electrical wire 41Y passes through the hole 56AY. The electrical wire 41Z passes through the hole 56AZ. An arrangement order of the electrical wires 41X, 41Y, and 41Z in the wiring side connector C1 coincides with an arrangement order of the electrical wires 41X, 41Y, and 41Z in the holding member 50A.

A slit reaching an outer edge of the sheet portion 52 is not formed in a periphery of the hole 56A in the holding member 50A. Thus, the electrical wire 41 is passed through the hole 56A from one surface side of the sheet portion 52 to attach the holding member 50A to the electrical wire herein.

The holding member 50A is provided on the end portion of the wiring member 40. The edge portion 51a on a side of one end portion of the wiring member 40 in the holding member 50A is located closer to the side of the attachment surface 33 in relation to the wiring member 40. The edge portion 51a on the side of one end portion of the wiring member 40 in the holding member 50A is the trough portion 54.

The holding member 50A is attached to the wiring member 40 as follows, for example. That is to say, as illustrated in FIG. 4, the holding member 50A in a folded state is disposed on a near side of a connector housing CH. The holding member 50A is disposed so that a cavity CA in the connector housing CH and the hole 56A corresponding to the electrical wire 41 inserted into the cavity CA are communicated with each other. In this state, the electrical wire 41 is passed through the hole 56A and further inserted into the cavity CA. Accordingly, the holding member 50A is attached to the electrical wire. At this time, the electrical wire 41 is inserted into the cavities CA and the holes 56A arranged in a row sequentially from one side, thus the arrangement order of the electrical wires 41X, 41Y, and 41Z in the wiring side connector C1 coincides with an arrangement order of the electrical wires 41X, 41Y, and 41Z in the holding member 50A. When intervals of the cavities CA and intervals of the holes 56A are different from each other, it is preferable that the connector housing CH and the holding member 50A are relatively moved in a direction in which the holes 56A are arranged side by side so that after the electrical wire 41 is inserted into one group of the corresponding hole 56A and cavity CA, one group of the hole 56A and the cavity CA corresponding to the electrical wire 41 inserted next are communicated with each other. The holding member 50A can be attached to the other electrical wires 42 and 43 in the similar manner.

When the insertion of the electrical wire into the hole 56A and the cavity CA is completed, the holding member 50A is moved to a predetermined position with respect to the wiring member 40 before being joined to the attachment surface 33. The holding member 50A is developed from a folded state before being joined to the attachment surface 33, and takes a predetermined posture with respect to the wiring member 40. At this time, the holding member 50A can be easily moved when it is in the folded state.

Two holding members 50A are attached to the electrical wire 42. In this case, it is preferable that after the electrical wire is passed through the hole 56A and the cavity CA while the two holding members 50A are located on a near side of the connector housing CH, the two holding members 50A are moved to a predetermined position.

A fixing piece 58A protrudes to a lateral side of the crest portion 53 in the sheet portion 52. Then, this fixing piece 58A is joined to the attachment surface 33.

The holding member 50B provided on the main wire part is described in more detail hereinafter.

One hole 56B is formed in the holding member 50B. All of the plurality of electrical wires 41, 42, and 43 are passed through one hole 56B.

The hole 56B preferably has a shape close to an oval shape which is longer in a width direction of the sheet portion 52 when viewed from the extension direction of the electrical wires 41, 42, 43 while the holding member 50B is in the attachment posture. As illustrated by a virtual line in FIG. 7, the hole 56A may be formed into a circular shape in the sheet portion 52 when viewed from the normal line direction of the sheet portion 52. Also in this case, the sheet portion 52 obliquely extends with respect to the attachment surface 33 in the attachment posture, thus the hole 56B has a shape close to an oval shape when viewed in the extension direction of the electrical wires 41, 42, and 43.

A slit 57 is formed in a periphery of the hole 56B in the holding member 50B. The slit 57 reaches an outer edge of the sheet portion 52. The slit 57 connects the periphery of the hole 56B and the outer edge of the sheet portion 52. The electrical wires 41, 42, and 43 are housed in the hole 56B through the slit 57. Accordingly, even when the end portions of the electrical wires 41, 42, and 43 are housed in the wiring side connector C1, the holding member 50B is easily attached to the plurality of electrical wires 41, 42, and 43.

The slit 57 is formed to extend toward the trough portion 54. Accordingly, when the sheet portion 52 is fixed to the attachment surface 33, the electrical wires 41, 42, and 43 hardly protrude to an outer side of the sheet portion 52. The slit 57 may be formed to extend toward the crest portion 53. The slit 57 may be formed to extend toward the side edge portion of the body 55.

A fixing piece 58B of the holding member 50B extends to a lateral side of the trough portion 54 of the sheet portion 52.

The fixing piece 58B is joined to the attachment surface 33. Accordingly, a lateral side portion of the trough portion 54 is joined to the attachment surface 33. Accordingly, the electrical wires 41, 42, and 43 hardly protrude to the outer side of the sheet portion 52 through the slit 57.

In the example illustrated in FIG. 6, the edge portions 51a and 51b in the holding member 50B serves as the crest portion 53. The edge portions 51a and 51b in the holding member 50B may serve as the trough portion 54.

The holding member 50 attached to the wiring member 40 is joined to the attachment surface 33 as described hereinafter. That is to say, the wiring member 40 to which the holding member 50 is attached is disposed along a predetermined route on the attachment surface 33. The holding member 50 is moved to a predetermined portion along the extension direction of the electrical wires 41, 42, and 43, and is developed from the folded state. For example, the holding member 50A is moved in a direction away from the connector housing CH from a state of being located on the near side of the connector housing CH. The electrical wires 41, 42, and 43 may be inserted into the hole 56B through the slit 57 while the holding member 50B is located in a predetermined position. The edge portions 51a and 51b on both sides of the holding member 50 are pulled to an opposite direction (outer direction), thus the holding member 50 is developed. Then, the sheet portion 52 (the fixing piece 58 herein) is joined to the attachment surface 33 while the wiring member 40 is disposed along a predetermined route on the attachment surface 33 and the holding member 50 is located in a predetermined position in a predetermined posture on the wiring member 40. All of the holding members 50 are joined to the attachment surface 33 to constitute the wiring module 20.

Effect Etc. of Embodiment 1

According to the wiring module 20 having the above configuration, the sheet portion 52 is joined to the attachment surface 33 while the wiring member 40 is passed through the hole 56 in the sheet portion 52, thus the sheet portion 52 suppresses the plurality of wiring members 40 away from the attachment surface 33. Accordingly, the wiring member 40 can be fixed to the attachment surface 33 as close as possible.

The sheet portion 52 is fused to the attachment surface 33. Accordingly, the sheet portion 52 is simply joined, to the base member 30.

The holding member 50 includes the plurality of sheet portions 52, thus the wiring member 40 can be held by the plurality of sheet portions 52. The holes 56 in the plurality of sheet portions 52 are formed in positions so that the corresponding holes 56 can be overlapped with each other when the plurality of sheet portions 52 are overlapped with each other, thus the wiring member 40 can be simply passed through the holes 56 in the plurality of sheet portions 52 while the plurality of sheet portions 52 are overlapped with each other.

The fold line CR is thrilled in a predetermined position in the ease where the plurality of sheet portions 52 are bended so that the holes 56 are overlapped with each other. Accordingly, the plurality of sheet portions 52 are bended along the fold line CR, thus the plurality of sheet portions 52 can be easily overlapped with each other so that the corresponding holes 56 are overlapped with each other.

The edge portion 51a on the side of one end portion of the wiring member 40 in the holding member 50A is located closer to the side of the attachment surface 33 in relation to the wiring member 40. Accordingly, when the wiring side connector C1 is grasped and connected to the apparatus side connector C2, for example, the holding member 50A hardly interferes with the operation, and the operation is easily performed.

The part of the sheet portion 52 located on the lateral side of the crest portion 53 is joined to the attachment surface 33 in the holding member 50A. Accordingly, the crest portion 53 can press the wiring member 40 toward the attachment surface 33, and the wiring member 40 is pressed by the holding member 50 toward the attachment surface 33.

One hole 56B in which the plurality of wiring members 40 are housed is formed in the holding member 50B. Accordingly, the plurality of wiring members 40 are passed through the hole 56B, thereby being held in the arranged state.

Modification Example

Figure 9:
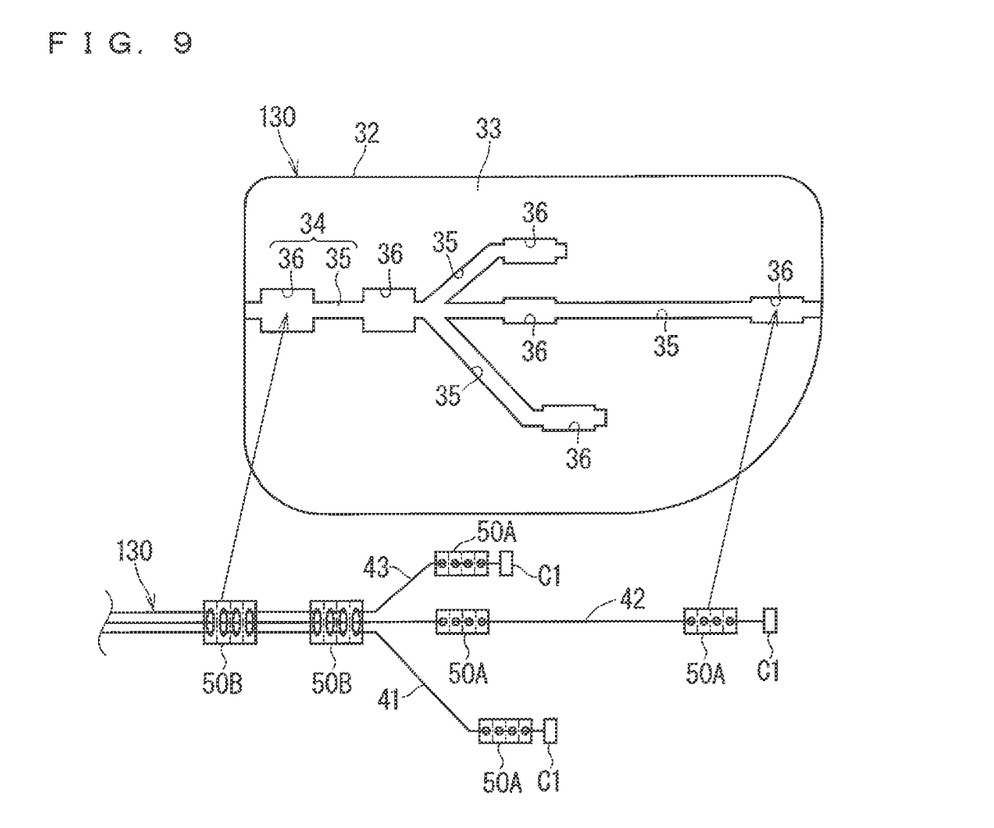
FIG. 9 is an exploded plan view illustrating a modification example of a base member.
Figure 10:
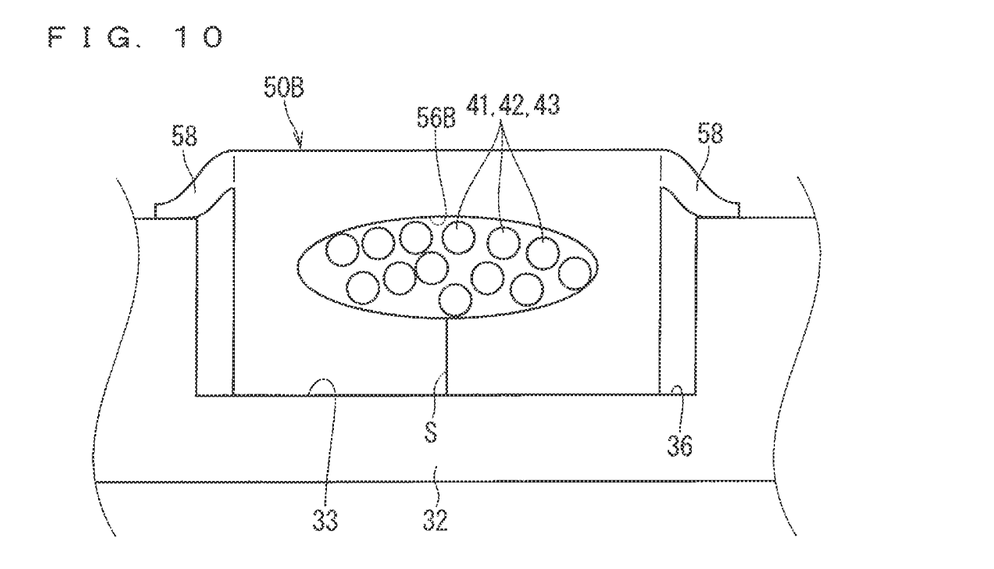
FIG. 10 is a front view illustrating the wiring member disposed on the base member according to the modification example.

FIG. 9 is an exploded plan view illustrating a modification example of the base member 30. FIG. 10 is a front view illustrating the wiring member 40 disposed on a base member 130 according to the modification example.

The base member 130 is different from the base member 30 in that a groove 34 is formed in the attachment surface 33. At least one of the plurality of wiring members 40 and the holding member 50 is housed in the groove 34. Accordingly, the plurality of wiring members 40 are disposed along the groove 34.

The groove 34 is formed to wholly extend on the base member 130 along the route of the wiring member 40. The groove 34 includes a wiring member housing groove 35 and a holding member housing groove 36. The wiring member housing groove 35 is a groove in which a part of the wiring member 40 which is not provided with the holding member 50 is housed. The holding member housing groove 36 is a groove in which the holding member 50 is housed. The holding member housing groove 36 is formed to have a larger width than the wiring member housing groove 35. The holding member 50 is housed in the holding member housing groove 36, the holding member 50 is positioned by the base member 130.

However, the groove 34 may be formed on a part of the base member 130 along the route of the wiring member 40. For example, one of the wiring member housing groove 35 and the holding member housing groove 36 may be preferably formed. For example, one of a groove housing the main wire part and a groove housing the branch wire part may be formed.

Any shape is applicable as a horizontal cross-sectional shape of the groove 34. Herein, the horizontal cross-sectional shape of the groove 34 is a rectangular shape. The horizontal cross-sectional shape of the groove 34 may be formed into an isosceles trapezoidal shape so that an upper opening portion has a larger width than a bottom portion. The bottom portion of the groove 34 may be flat in a width direction and an extension direction of the groove 34. The bottom portion of the groove 34 may have a concave-convex shape in the width direction and the extension direction of the groove 34.

The wiring member 40 is located between the upper opening portion and the bottom portion of the groove 34. A part of the wiring member 40 may protrude to an upper side of the groove 34. When the wiring member 40 meanders to get close to and away from the attachment surface 33, a part of the wiring member 40 getting close to the attachment surface 33 may be housed in the groove 34.

The body 55 of the sheet portion 52 is also housed in the groove 34. The fixing piece 58 is joined to a periphery of the upper opening portion of the groove 34. The sheet portion 52 may be fixed to an inner surface of the groove 34. The sheet portion 52 may be fixed to a side surface of the groove 34. The sheet portion 52 may be fixed to the bottom portion of the groove 34.

A part of the body 55 of the sheet portion 52 protrudes to the upper side of the groove 34. The body 55 of the sheet portion 52 may not protrude to the upper side of the groove 14. The crest portion 51 of the holding member 50 may be located between the upper opening portion and the bottom portion of the groove 34.

Figure 11:
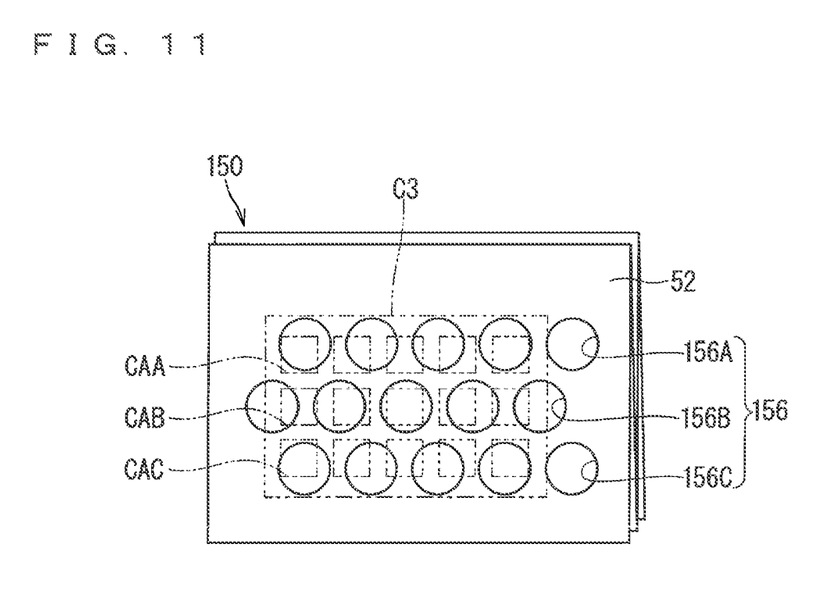
FIG. 11 is a perspective view illustrating a modification example of the holding member.

FIG. 11 is a perspective view illustrating a modification example of the holding member 50.

A holding member 150 according to the modification example is different from the holding member 50 in that a plurality of holes 156 separately disposed in a plurality of stages are formed as holes. Accordingly, the plurality of wiring members 40 can be held separately in the plurality of stages. The holes 156 in the plurality of stages are separated in the extension direction of the wiring member 40 in a plan view of the base member 30. The plurality of holes 56 are formed in each stage. The plurality of holes 56 are disposed to be arranged side by side along each of the plurality of lines. Herein, the plurality of holes 156 are separately formed in three stages. The plurality of holes may be separately formed in two stages or four or more stages. The number of stages of the holes 156 is preferably the number of stages corresponding to the number of stages of a multistage connector in the end portion of the electrical wire.

FIG. 11 illustrates a multistage connector C3 by a virtual line. Herein, the number of stages of the multistage connector C3 is three, however, two or four or more is also applicable. The multistage connector C3 is one example of the wiring side connector provided on the end portion of the wiring member 40. The holding member 150 is preferably be provided in the end portion of the wiring member 40 connected to the multistage connector C3, for example. Accordingly, the plurality of wiring members 40 are held by the holding member 150 with an arrangement close to the arrangement in the multistage connector C3. That is to say, the electrical wire housed in a cavity CAA in a first stage in the multistage connector C3 passes through a hole 156A in a first stage in the holding member 150. The electrical wire housed in a cavity CAB in a second stage in the multistage connector C3 passes through a hole 156B in a second stage in the holding member 150. The electrical wire housed in a cavity CAC in a third stage in the multistage connector C3 passes through a hole 156C in a third stage in the holding member 150.

The holes 156 in the plurality of stages are disposed in a staggered arrangement. Accordingly, a density of the holes 156 is increased. More specifically, the hole 156B in the second stage is formed in a position between the holes 156A in the first stage along the width direction of the sheet portion 52. The hole 156C in the third stage is formed in a position between the holes 156B in the second stage along the width direction of the sheet portion 52. The hole 156C in the third stage is formed in the same position as the hole 156A in the first stage along the width direction of the sheet portion 52. The size of the holes 156 in each stage is the same, and a center of the hole 156A in the first stage and a center of the hole 156B in the second stage deviate from each other along the width direction of the sheet portion 52. The center of the hole 156B in the second stage and a center of the hole 156C in the third stage deviate from each other along the width direction of the sheet portion 52. The center of the hole 156A in the first stage and the center of the hole 156B in the third stage are located in the same position along the width direction of the sheet portion 52.

The holes 156 in the plurality of stages may be arranged in a line arrangement. Specifically, the holes 156 in each stage may be formed in the same position long the width direction of the sheet portion 52.

In the above description, the base members 30 and 130 are the members incorporated between the door panel 12 and the door trim 16, however, this configuration is not necessary. For example, the base members 30 and 130 may be members incorporated between a roof panel and a roof lining, or may also be members incorporated between an exterior member constituting an outer appearance and an interior member constituting an inner appearance in a vehicle. For example, the base members 30 and 130 may be interior members such as the door trim 16, a roof lining, or an installment panel.

In the above description, the fixing piece 58 in the sheet portion 52 is joined to the attachment surface 33, however, this configuration is not necessary. The sheet portion 52 may not include the fixing piece 58. A side edge of the body 55 in the sheet portion 52 may be joined to the attachment surface 33. In the above description, the fixing piece 58 is a part of the side edge portion of the body 55 protruding to the lateral side, however, this configuration is not necessary. Parts of the edge portions 51a and 51b may protrude in the extension direction of the wiring member 40 (a direction connecting the crest portion 53 and the trough portion 54) to be the fixing pieces.

When two or more holding members 50 are provided for the same electrical wire such as two holding members 50A through which the second electrical wire 42 is passed or two holding members 50B passed through the main wire part, two holding members 50 may be provided as describe hereinafter. That is to say, it is also applicable that after the electrical wire is passed through the hole 56 while the sheet portions 52 are connected to be one holding member 50, the sheet portion 52 is separated to be two or more holding members 50.

In the above description, the plurality of holes 56A through which one electrical wire is passed are formed in the sheet portion 52, or one hole 56B through which the plurality of electrical wires 41, 42, and 43 are passed is formed, however, this configuration is not necessary. For example, a plurality of holes through which a plurality of electrical wires are passed may be formed in the sheet portion 52. Specifically, when four electrical wires pass through the sheet portion 52, for example, two holes through which two electrical wires pass may be formed in the sheet portion 52. For example, both a hole through which a plurality of electrical wires pass and a hole through which one electrical wire pass may be formed in the sheet portion. Specifically, when four electrical wires pass through the sheet portion 52, for example, one hole through which two electrical wires pass and two holes through which one electrical wire passes may be formed in the sheet portion 52. For example, when four electrical wires include two thin electrical and two thick electrical wires, it is also applicable that the two thin electrical wires are passed through the same one hole and the two thick electrical wires are separately passed through the remaining two holes.

In the above description, two types of holding members 50A and 50B are used differently in one wiring module 20, however, this configuration is not necessary. All of the holding members provided in one wiring module 20 may be the same type of holding member. For example, the holding member 50A may be provided in place of the holding member 50B. In this case, the holding member 50A holding the first electrical wire 41, the holding member 50A holding the second electrical wire 42, and the holding member 50A holding the three electrical wire 43 may be provided in parallel to each other in the main wire part. For example, the holding member 50B may be provided in place of the holding member 50A.

The configurations described in the embodiments and modification examples thereof can be appropriately combined as long as they are not contradictory.

EXPLANATION OF REFERENCE SIGNS 10 door
12 door panel
13 outer panel
14 inner panel
15 opening
16 door trim
18 apparatus
20 wiring module
30, 130 base member
32 main plate
33 attachment surface
34 groove
35 wiring member housing groove
36 holding member housing groove
40 wiring member
41, 41X, 41Y, 41Z, 42, 43 electrical wire
50, 50A, 50B, 150 holding member
51a, 51b edge portion
52 sheet portion
53 crest portion
54 trough portion
55, 55A, 55B body
56, 56AX, 56AY, 56AZ, 56B, 156 hole
57 slit
58, 58A, 58B fixing piece
C1 wiring side connector
C2 apparatus side connector
CR fold line

The invention claimed is:

1. A wiring module, comprising:
a base member having an attachment surface;
a plurality of wiring members disposed on the attachment surface; and
a holding member holding the plurality of wiring members in an arranged state on the attachment surface, wherein
the holding member includes at least one sheet portion in which at least one hole is formed,
the plurality of wiring members are passed through the at least one hole and held in the arranged state,
the sheet portion is joined to the attachment surface,
a plurality of holes disposed separately in a plurality of stages are formed as the at least one hole,
a hole in a second stage in the plurality of holes is formed in a position between holes in a first stage in the plurality of holes, and
at least one of the plurality of wiring members passes through each of the plurality of holes.

2. The wiring module according to claim 1, wherein the sheet portion is fused to the attachment surface.

3. The wiring module according to claim 1, wherein
the holding member includes a plurality of sheet portions made up of the plurality of sheet portions connected in a longitudinal direction of the wiring members, and
the holes in the plurality of sheet portions are formed in positions so that the holes which correspond to each other are overlapped with each other when the plurality of sheet portions are bended at a predetermined position and overlapped with each other.

4. The wiring module according to claim 3, wherein a fold line is formed in the predetermined position.

5. The wiring module according to claim 1, wherein
an edge portion of the holding member which is provided in an end portion of the wiring member is located closer to a side of the attachment surface in relation to the wiring member, the edge portion provided on a side of the end portion of the wiring member in the holding member.

6. The wiring module according to claim 1, wherein
a portion where the sheet portion covers the wiring member is a crest portion, and
a portion of the sheet portion located on a lateral side of the crest portion is joined to the attachment surface.

7. The wiring module according to claim 1, wherein the plurality of wiring members are passed through one hole of the at least one hole.

8. The wiring module according to claim 1, wherein
a groove in which at least one of the plurality of wiring members and the holding member is housed is formed in the base member.

9. A wiring module, comprising:
a base member having an attachment surface;
a plurality of wiring members disposed on the attachment surface;
a connector that includes a connector housing in which a plurality of cavities are formed; and
a holding member holding the plurality of wiring members in an arranged state on the attachment surface, wherein
the holding member includes at least one sheet portion in which at least one hole is formed,
the plurality of wiring members are passed through the at least one hole and held in the arranged state,
the sheet portion is joined to the attachment surface, and
a plurality of holes as many as the plurality of cavities of the connector housing are formed in the sheet portion, the plurality of holes are formed at positions corresponding to the plurality of cavities, and the plurality of wiring members are individually passed through corresponding holes among the plurality of holes and corresponding cavities among the plurality of cavities.

10. The wiring module according to claim 9, wherein the plurality of holes disposed separately in a plurality of stages are formed in the sheet portion.

11. The wiring module according to claim 10, wherein a hole in a second stage in the plurality of holes is formed in a position between holes in a first stage in the plurality of holes.

12. The wiring module according to claim 9, wherein the plurality of cavities of the connector housing are formed in a plurality of stages and each of the stages has at least two cavities.

* * * * *